United States Patent Office 2,934,417
Patented Apr. 26, 1960

2,934,417

HYDRAZINE COMPOSITIONS OF LOW FREEZING POINT AND USES THEREOF

Walter A. Schulze, Bartlesville, Okla., assignor to Phillips Petroleum Company, a corporation of Delaware Application April 18, 1949, Serial No. 88,112

1 Claim. (Cl. 52—.5)

This invention relates to the production of power from compositions comprising hydrazine. The invention also relates to the storage of hydrazine at temperatures substantially below its normal freezing point, and to the production of power from such compositions while they are stored at low temperatures.

The production of power for objects that move at high rates of speed, as by jet propulsion, presents many problems which are not encountered in the production of power for such things as automobiles, propeller driven airplanes, and the like. Recently, there have come into use such methods of power production as are utilized in jet propelled airplanes, rockets, rocket boosters, and the like. One of the fuel components which has been proposed for use in such power plants is hydrazine, and when burned with substantially pure oxygen or with other oxidants this material has a specific impulse (which is equivalent to pounds of thrust obtained per pound of propellant burned per second), which is higher than many other materials proposed for such use. One of the disadvantages of hydrazine, however, is the fact that it has a high melting point; when the purity is approximately 100 percent, the melting point is about 35° F. Since fuels for such uses are not only stored under conditions where the temperature will become much lower than this, but are often used in higher reaches of the atmosphere where the surrounding temperature is as low as —20° F. to —80° F., or lower, it is impossible to use pure hydrazine as a fuel without providing some sort of modified storage facilities. I have now found that combinations comprising a major amount of hydrazine and a minor amount of hydrogen sulfide have surprisingly low freezing points, and at the same time when used as a fuel to produce power, will produce nearly as much power as pure hydrazine. I have also found that when a small amount of water is added to such hydrazine-hydrogen sulfide compositions that the freezing points of the resulting three-component mixtures are extremely low.

An object of this invention is to provide an improved method of producing power by the combustion of hydrazine.

Another object of this invention is to provide a hydrazine fuel which is stable for long periods of storage, and which can be stored without freezing at extremely low temperatures.

Still another object of my invention is to provide a fuel comprising hydrazine which has a low freezing point and a very high specific impulse.

Other objects and advantages of my invention will become apparent, to one skilled in the art, from the accompanying disclosure and discussion.

Figure 1:
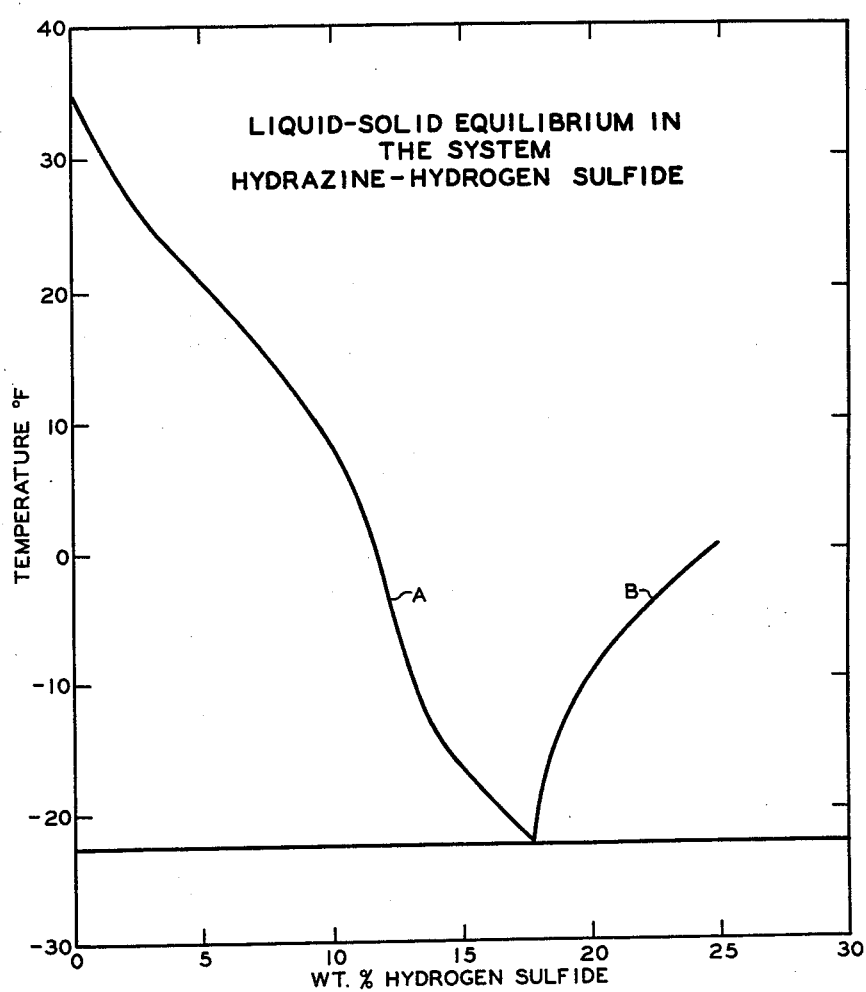
Figure 1 is a diagram illustrating the freezing points and solid-liquid phase equilibria of hydrazine compositions containing hydrazine and up to 25 percent by weight hydrogen sulfide.

As is illustrated in Figure 1, I have found that when dry hydrogen sulfide is added to anhydrous liquid hydrazine, and the resulting composition is cooled, that the freezing point of the composition is appreciably lower than the freezing point of pure hydrazine. As such a mixture is cooled, a point is reached where the solution becomes gel-like. If a cooling curve is being determined, the temperature will remain constant at this point for a few minutes, depending upon the rate of cooling, and upon further cooling this gel-like material solidifies. When the composition of the mixture is about 82 percent by weight hydrazine and about 18 percent by weight hydrogen sulfide, the freezing point of the mixture is about —22° to —23° F. and the solid which separates has the same composition as the liquid. In one determination the amounts of hydrazine and hydrogen sulfide were 82.2 percent and 17.8 percent, respectively, and the freezing point was —22.9° F. When the concentration of hydrogen sulfide in the mixture is less than this amount, or somewhat greater than this amount, a solid material will appear in the mixture at a somewhat higher temperature, as is illustrated by curves A and B on Figure 1, and the solid which separates out has the same composition as the material which separates at about —22° to —23° F. In other words, the composition which freezes at this temperature is a eutectic mixture. This composition has a weight ratio of hydrazine to hydrogen sulfide of about 4.6:1. Compositions within the area above the curves A and B are completely liquid, and may be employed above the minimum temperatures indicated by the curves without encountering freezing of any of the material.

Although water freezes at 32° F., which is only about 3° below the freezing point of pure hydrazine, solutions of water in hydrazine will freeze at much lower temperatures. The freezing point of such mixtures is illustrated by curve C in Figure 2. It will be noted, however, that in order to obtain a composition, the freezing point of which is as low as —40° F., or lower, it must contain a large amount of water, i.e. more than 25 percent by weight.

Figure 2:
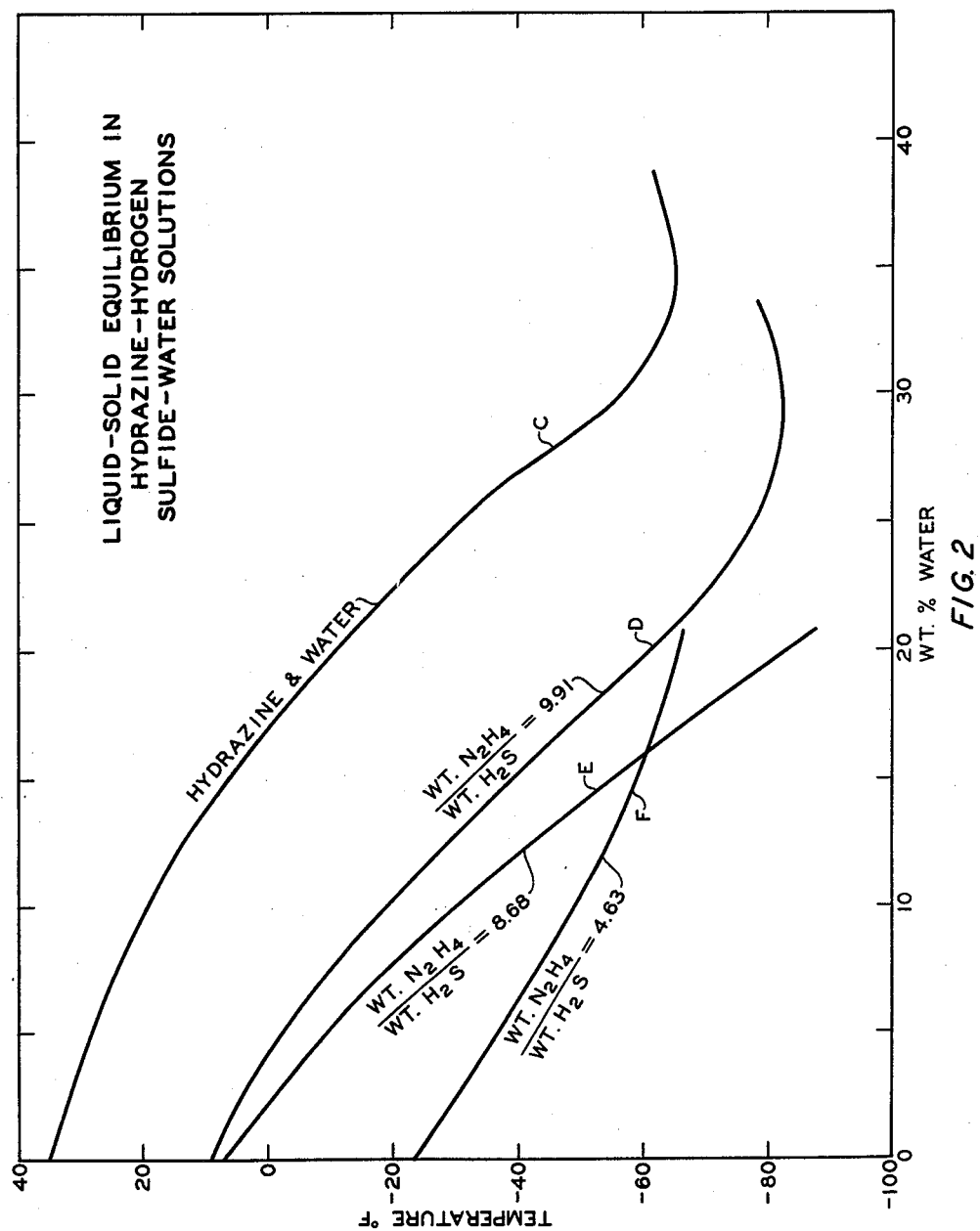
Figure 2 is a freezing point diagram illustrating the freezing point data of compositions comprising hydrazine and water, and hydrazine and hydrogen sulfide together with water.

I have also found that one of the interesting features of compositions comprising hydrazine and hydrogen sulfide is the influence of a small amount of water upon the freezing of these compositions, as is illustrated by curves D, E, and F in Figure 2. When water is added to a mixture of hydrazine and hydrogen sulfide having the same composition as the eutectic mixture of hydrogen sulfide and hydrazine, the freezing point of the total mixture gets lower and lower as the amount of water is increased, as is illustrated by curve F. When less hydrogen sulfide is present in the mixture, such as when the ratio of hydrazine to hydrogen sulfide is about 9.9:1 by weight, the addition of increasing amounts of water to the mixture results in a change of the freezing point illustrated by curve D. When a somewhat larger amount of hydrogen sulfide is present, such as a weight ratio of hydrazine to hydrogen sulfide of about 8.7:1, the freezing point of the mixtures resulting from the addition of water shows a surprising variation from curves F and D just discussed, as is shown by curve E of Figure 2. The slope of curve E is appreciably steeper than the slopes of either curves C, D, or F, and a composition having a much lower freezing point can be obtained when the hydrazine and hydrogen sulfide have this ratio, than when the ratios of these two materials are very much above or below this value, as illustrated by curves D and F.

It is also particularly interesting to note that the slope of curve A of Figure 1 is very much steeper than the slope of curve C of Figure 2. Although hydrogen sulfide has a molecular weight of 34 and water has a molecular weight of only 18, a given amount of depression in the freezing point of hydrazine can be obtained with a much smaller amount of hydrogen sulfide than can be obtained with water.

Figure 3:
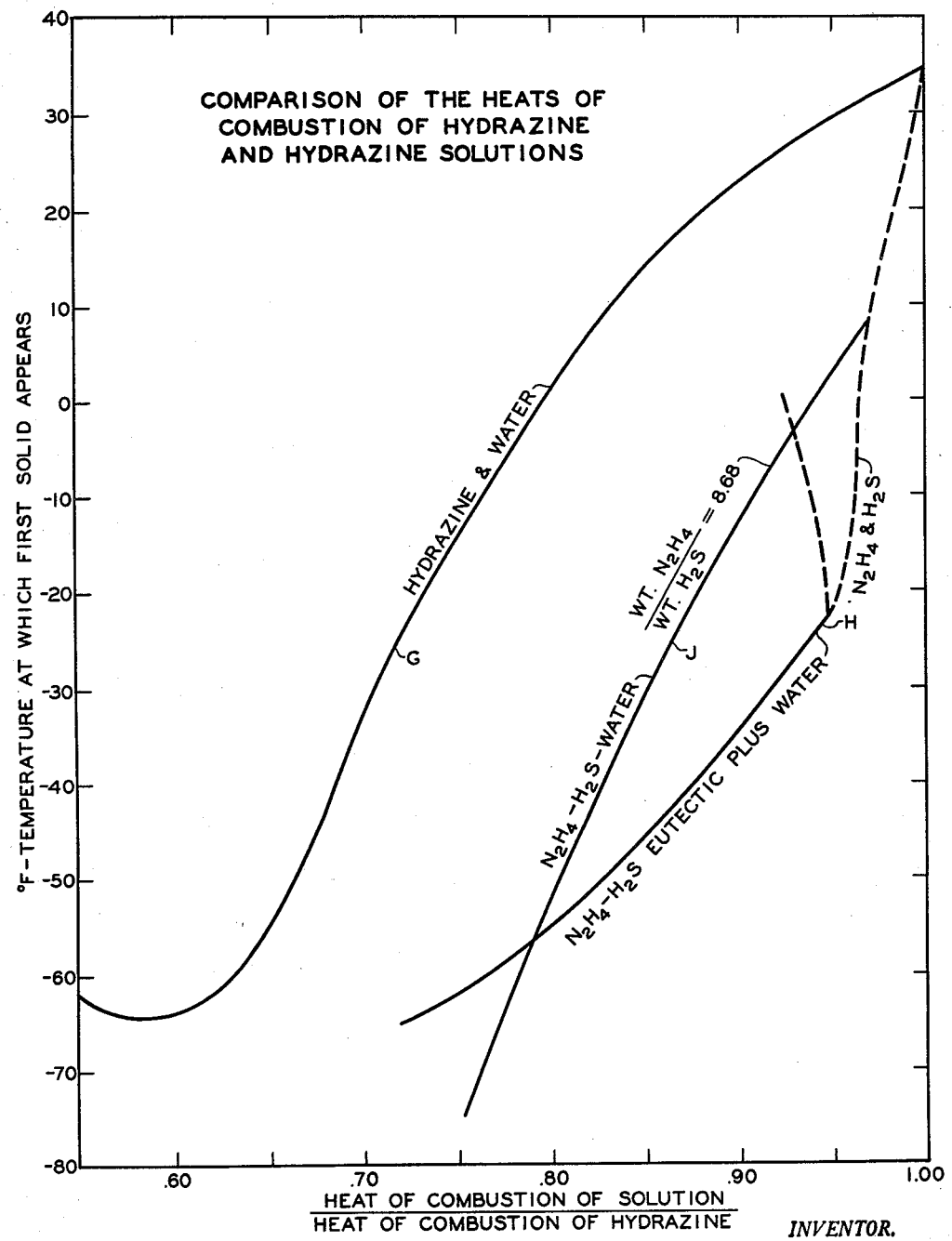
Figure 3 is a graph illustrating the heat of combustion of solutions in which water and/or hydrogen sulfide are at present dissolved in liquid hydrazine. In this diagram the heat of combustion of the resulting solution is presented as a fraction of the heat of combustion of pure hydrazine.

It is, of course, important that when a fuel is used for power, and particularly for power for the propulsion of such objects as airplanes or rockets, wherein not only is propulsion an important factor but also the weight carried and lifted against the force of gravity by the propelling force is important, it is necessary to use a fuel which not only has a lower freezing point, but a higher specific impulse. Since specific impulse is a direct function of heat of combustion, the valuable effects of the unique properties of mixtures comprising hydrazine and hydrogen sulfide can be further illustrated by the curves in Figures 3 and 4. Referring to Figure 3, the decrease in the heat of combustion as water is added to hydrazine is illustrated by curve G. Again, taking as a useful criterion a mixture having a freezing point of −40° F., it will be seen that such a mixture has less than 70 percent the heat of combustion that pure hydrazine has, or in other words, has less than 70 percent the specific impulse that hydrazine has. However, the addition of hydrogen sulfide to liquid hydrazine not only markedly lowers the freezing point, but also has a markedly less deteriorating effect upon the power which is available from burning the hydrazine fuel. As hydrogen sulfide is added to hydrazine, the relative heat of combustion decreases only a very little, so that when an amount of hydrogen sulfide is added to form the eutectic mixture having a freezing point of −22.9° F., the heat of combustion of the resulting solution is still 95 percent that of pure hydrazine. Although the addition of water to this eutectic mixture does not lower the freezing point as markedly as does the addition of water to a hydrazine-hydrogen sulfide mixture having a smaller concentration of hydrogen sulfide, nevertheless the effect upon the relative heat of combustion is much less adverse when water is added to the eutectic mixture than when water is added to a mixture having a lower ultimate freezing temperature, as is illustrated by curves H and J of Figure 3. When sufficient water is added to this eutectic mixture to reach a freezing point of −40° F., the relative heat of combustion is about 87.5 percent that of pure hydrazine, as compared to only 68.5 percent when only hydrazine and water is the power-producing fuel. However, when it is necessary to have a fuel whose freezing point is much lower, such as −60° F. or lower, it is preferable to use a composition having a smaller amount of hydrogen sulfide, as is illustrated by the bottom portion of curve J of Figure 3.

Figure 4:
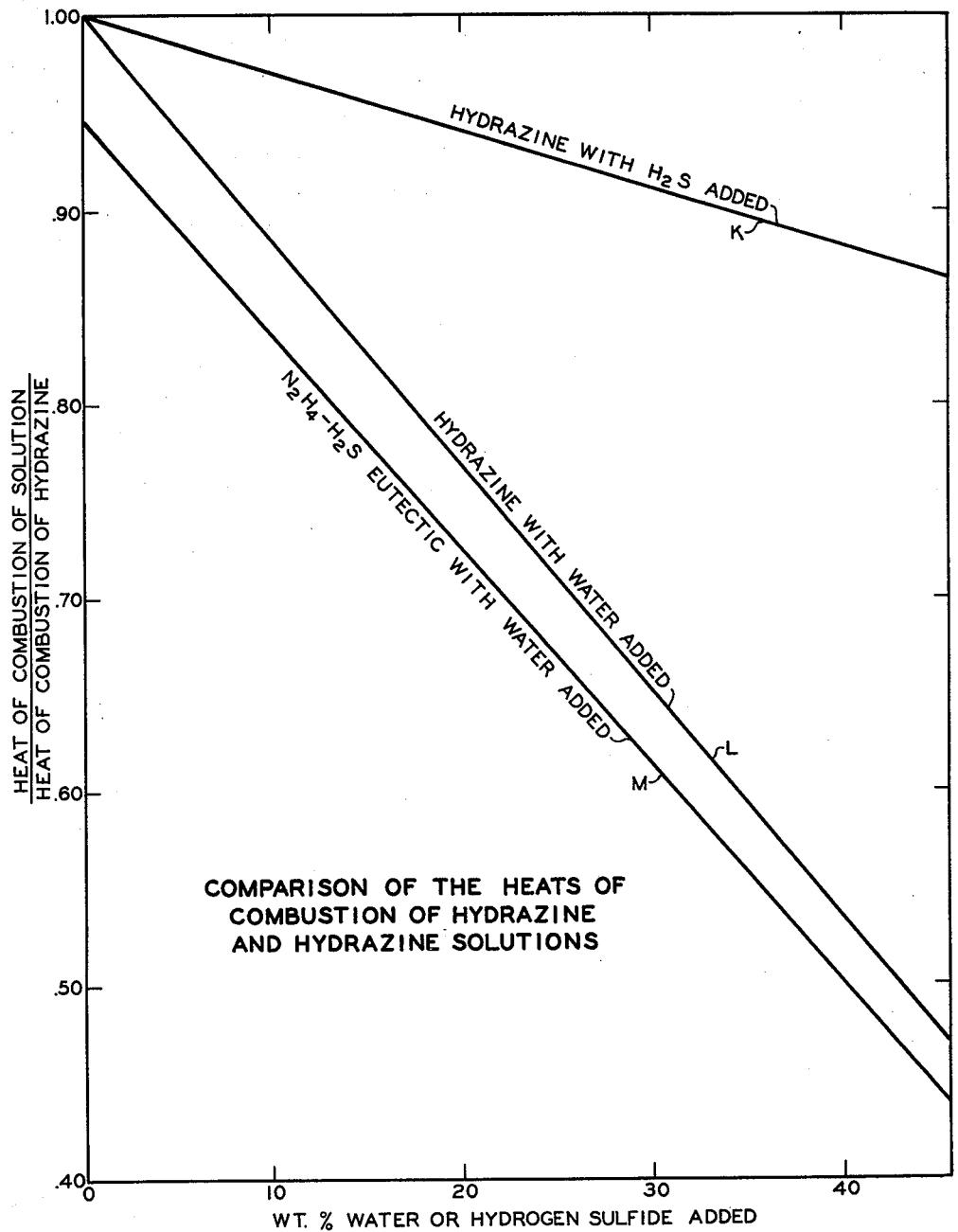
Figure 4 is a diagram illustrating in another manner the influence of hydrogen sulfide and/or water upon the heat of combustion of hydrazine when each is present as a minor component in the final composition.

This moderate effect upon the heat of combustion for hydrogen sulfide as contrasted with the effect of water is further illustrated by curves K, L and M of Figure 4. The gentle slope of curve K illustrates the small reduction in heat of combustion when hydrogen sulfide is added to hydrazine, while curve L illustrates the very marked and undesirable effect upon the heat of combustion when water is added to hydrazine. The addition of water to the eutectic mixture of hydrazine and hydrogen sulfide results in a curve having a similarly steep slope, as is shown by curve M of Figure 4, but of course, a satisfactorily low freezing point of the resulting mixture can be obtained with this three component mixture with much smaller decrease in the amount of hydrazine present.

Based upon the foregoing information, I have found that a very efficient method of producing power by the combustion of hydrazine is obtained, when it is necessary to store the hydrazine composition at low temperatures, by using a composition containing hydrogen sulfide in such proportion that the ratio of hydrazine to hydrogen sulfide is between about 2:1 and about 20:1, and that when it is necessary to use a fuel for the production of power which must be able to withstand storage at temperatures as low as −80 or −100° F., a very efficient fuel can be provided when not more than 25 percent of water is added to hydrazine-hydrogen sulfide compositions. When the hydrazine fuel is to be subjected to sub-zero temperatures below −20° F. but which are not lower than about −60° F., a very desirable fuel is obtained from a composition comprising hydrazine and hydrogen sulfide having a weight ratio of about 4.6:1, together with water in an amount not greater than about 16 percent by weight of the total composition. But when the fuel must be used or stored under conditions which go appreciably lower than about −60° F., it is usually preferable to employ the unique compositions in which the ratio of hydrazine to hydrogen sulfide is approximately 8.7:1, together with water in an amount not greater than 25 percent by weight of the total mixture. The properties of these compositions are illustrated by curve E of Figure 2 and curve J of Figure 3.

Such a fuel as the foregoing can be used to produce power by combustion under such conditions as have heretofore been practiced for the combustion of either pure hydrazine, or other compositions in which hydrazine is a major component. This is usually effected by feeding separate streams of the hydrazine composition and relatively pure free oxygen or other oxidant to a combustion chamber, and from which the products of combustion are expelled in a manner to produce a high thrust.

As will be evident to those skilled in the art, various modifications of this invention can be made, or followed, in the light of the foregoing disclosure and discussion, without departing from the spirit or scope of the disclosure or from the scope of the claim.

I claim:

A liquid composition comprising primarily hydrazine and having a high heat of combustion and a freezing point below −60° F., which comprises hydrazine and hydrogen sulfide in a weight ratio of 8.7:1 together with water in an amount not greater than 25 percent by weight of the total mixture and sufficient to produce such a freezing point as determined from line E of Figure 2.

References Cited in the file of this patent

UNITED STATES PATENTS

| | | |
|---|---|---|
| 2,406,926 | Summerfield | Sept. 3, 1946 |
| 2,521,026 | Solomon | Sept. 5, 1950 |

OTHER REFERENCES

"Comprehensive Treatise on Inorganic and Theoretical Chemistry" (1930) by Mellor, vol. 10, pages 135–136.
S.A.E. Journal, issue of December 1947, pages 24–25.
Coast Artillery Journal, issue of Jan.-Feb. 1948, p. 27.